(12) United States Patent
Chase et al.

(10) Patent No.: US 8,454,836 B2
(45) Date of Patent: Jun. 4, 2013

(54) METHOD FOR REMOVING WATER FROM AN ORGANIC LIQUID

(75) Inventors: George G. Chase, Wadsworth, OH (US); Darrell H. Reneker, Akron, OH (US); Daniel Smith, Stow, OH (US)

(73) Assignee: The University of Akron, Akron, OH (US)

( * ) Notice: Subject to any disclaimer, the term of this patent is extended or adjusted under 35 U.S.C. 154(b) by 297 days.

(21) Appl. No.: 11/522,031

(22) Filed: Sep. 15, 2006

(65) Prior Publication Data
US 2007/0062855 A1    Mar. 22, 2007

Related U.S. Application Data

(60) Provisional application No. 60/717,314, filed on Sep. 15, 2005.

(51) Int. Cl.
*B01D 17/022*    (2006.01)

(52) U.S. Cl.
USPC ..................................... 210/689; 210/DIG. 6

(58) Field of Classification Search
USPC .... 210/502.1, 689, DIG. 6; 208/188; 502/402
See application file for complete search history.

(56) References Cited

U.S. PATENT DOCUMENTS

| | | | | |
|---|---|---|---|---|
| 3,417,013 A | * | 12/1968 | Roberts | 208/187 |
| 5,252,203 A | * | 10/1993 | Lyda | 210/172.5 |
| 6,101,818 A | | 8/2000 | Thomas et al. | |

FOREIGN PATENT DOCUMENTS

WO    WO 03/086234 A2 * 10/2003

\* cited by examiner

*Primary Examiner* — Matthew O Savage
(74) *Attorney, Agent, or Firm* — Renner Kenner Greive Bobak Taylor & Weber

(57) ABSTRACT

The present invention relates to methods and apparatus for removing water and/or water-based compounds from organic liquids/fluids. In one embodiment, the present invention relates to methods and apparatus that utilize fibrous media that contains, is impregnated, or is formed from at least one super absorbent compound, where the fibrous media is formed from nanofibers.

9 Claims, 9 Drawing Sheets

METHOD FOR REMOVING WATER FROM AN ORGANIC LIQUID

RELATED APPLICATION DATA

This application claims priority from U.S. Provisional Patent Application No. 60/717,314, filed Sep. 15, 2005 and entitled "Method and Apparatus for Removal of Water and/or Water-Based Compounds from Organic Liquids or Vice-Versa," which is hereby incorporated by reference in its entirety.

FIELD OF THE INVENTION

The present invention relates to methods and apparatus for removing water and/or water-based compounds from organic liquids/fluids. In one embodiment, the present invention relates to methods and apparatus that utilize fibrous media that contains, is impregnated, or is formed from at least one super absorbent compound, where the fibrous media is formed from nanofibers.

BACKGROUND OF THE INVENTION

A number of methods have been developed in order to separate water from chemical mixtures, in particular organic liquids/fluids. The known methods include the use of alkaline earth compounds, carbon molecular sieves, oleum, distillation, and membranes. Many of the known methods are disadvantageous because the processes are inefficient or uneconomical; the drying agents undergo undesirable side reactions and/or adsorbs or absorbs the material being dried.

Drying agents used principally in connection with circulating refrigerants include activated aluminum oxide, silica gels and molecular sieves in solid or granulated form. During use, these materials are abraded by the flow of the cooling liquid and mechanical vibrations and form dust particles. In order to prevent the dust from clogging the valves and conduits of the refrigeration system, a filter must be employed. The use of such a filter costs time (for installation) and money.

Additional technologies exist for the removal of water from chemical mixtures/compounds. These include the use filters to either enlarge the water drops for subsequent removal or use materials with water repellent surfaces that block the water drops from passing through a filter. In some instances, super absorbent compounds have been used to remove water from various chemical mixtures/liquids (e.g., organic liquids/fluids).

Super absorbent materials are available commercially that hold 20 times or more their own weight in water. To date the use of a super absorbent compound to remove water from a chemical mixture/liquid has generally been based on super absorbent compounds that are used in a granular form. There are a number of drawbacks associated with water removal methods that utilize granular super absorbents, especially in the case where the granular super absorbents are used in combination with one or more water-removal filtration methods. Some of the drawbacks include the aggregation of the water-laden super absorbent granules into a gel-like substance. This gel-like substance can result in the reduction and/or complete blockage of the chemical liquid through the filtration medium.

Thus, there is a need in the art for a method and apparatus that permits the efficient and reliable removal of water from various organic mixtures/liquids.

SUMMARY OF THE INVENTION

The present invention relates to methods and apparatus for removing water and/or water-based compounds from organic liquids/fluids. In one embodiment, the present invention relates to methods and apparatus that utilize fibrous media that contains, is impregnated, or is formed from at least one super absorbent compound, where the fibrous media is formed from nanofibers.

In one embodiment, the present invention relates to a method for removing water from an organic liquid, the method comprising the step of: (A) contacting a water-containing organic liquid with at least one filtration medium designed to remove all or substantially all of the water present in the organic liquid; and (B) removing substantially all of the water from the organic liquid to yield a water-free organic liquid, wherein the at least one filtration medium is formed from fibers and/or nanofibers and the fibers and/or nanofibers either contain, are coated with, or are in communication with at least one absorbent component and/or compound.

In another embodiment, the present invention relates to an apparatus designed to remove water from organic fluids and/or liquids, wherein the apparatus comprises: (i) a containment means for containing one or more water-laden organic fluids and/or liquids; (ii) at least one filtration medium, wherein the filtration medium is in fluid communication with the one or more water-laden organic fluids and/or liquids and is designed to remove water from the one or more water-laden organic fluids and/or liquids, wherein the at least one filtration medium is formed from one or more nanofibers and the one or more nanofibers either contain, are coated with, or are in communication with at least one absorbent component and/or compound.

Expected advantages of the present invention include, but are not limited to: (1) a more efficient and complete removal of water from the host fluid; (2) less leakage or chance of the water drops from penetrating through the filtration media; (3) easy removal of the filtration media (and thus the entrapped water) from the liquid stream; (4) ease of scale-up; (5) devices can be made that monitor pressure drop to alert the operator when the filtration media/medium needs to be changed; and (6) organic liquids do not necessarily have to pass through the filtration medium, but may only need to pass by the medium, in order to undergo water removal. In the case of (6) this method would help mitigate any potential migration of the super absorbent compound from the filtration media to the organic liquid. In one instance the present invention enables the adsorption of water drops/droplets and also the adsorption of dissolved water from an organic fluid/liquid, a combined capability that most filters cannot provide.

BRIEF DESCRIPTION OF THE DRAWINGS

FIG. 11(*b*) is an illustration of the embodiment of FIG. 11(*a*) after an indeterminate amount of water and/or a water-based compound has been captured;

FIG. 12(*b*) is an illustration of the embodiment of FIG. 12(*a*) after an indeterminate amount of water and/or a water-based compound has been captured;

FIG. 13(*b*) is an illustration of one possible method to remove the water-laden absorbent mats generated in the method of FIG. 13(*a*).

DETAILED DESCRIPTION OF THE INVENTION

Figure 1:
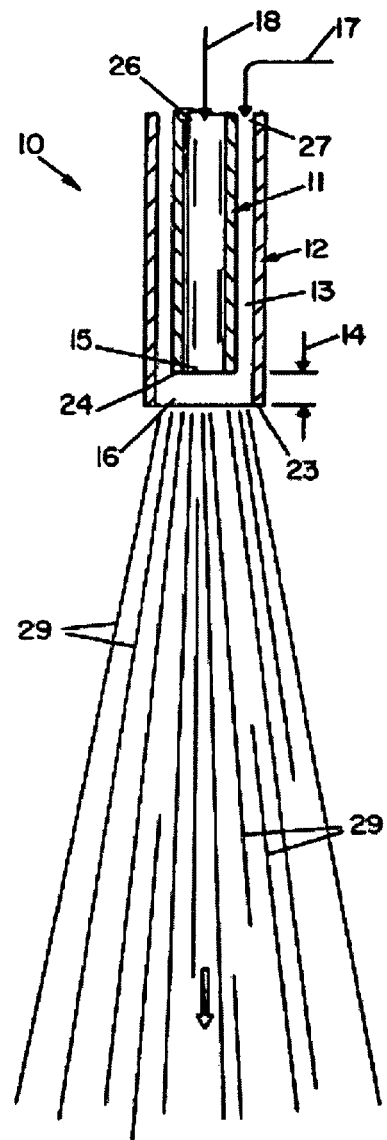
FIG. 1 is a schematic diagram of an apparatus for producing flexible ceramic nanofibers according to this invention.

The present invention relates to methods and apparatus for removing water and/or water-based compounds from organic liquids/fluids. In one embodiment, the present invention relates to methods and apparatus that utilize fibrous media that contains, is impregnated or is formed from at least one super absorbent compound, where the fibrous media is formed from nanofibers.

In one embodiment, the present invention relates to a method and apparatus designed to remove water from organic fluids/liquids, where the method and apparatus utilize a filtration medium that comprises at least one super absorbent compound that is contained on and/or impregnated in the fibers of the filtration medium, where the filtration medium is formed from nanofibers.

In another embodiment, the present invention relates to filtration media that are formed from nanofibers that are coated with a suitable super absorbent compound. In yet another embodiment, the nanofibers of the present invention can be formed from the combination at least one polymer compound and at least one super absorbent compound.

As used herein nanofibers are fibers having an average diameter in the range of about 1 nanometer to about 25,000 nanometers (25 microns). In another embodiment, the nanofibers of the present invention are fibers having an average diameter in the range of about 1 nanometer to about 10,000 nanometers, or about 1 nanometer to about 5,000 nanometers, or about 3 nanometers to about 3,000 nanometers, or about 7 nanometers to about 1,000 nanometers, or even about 10 nanometers to about 500 nanometers. In another embodiment, the nanofibers of the present invention are fibers having an average diameter of less than 25,000 nanometers, or less than 10,000 nanometers, or even less than 5,000 nanometers. In still another embodiment, the nanofibers of the present invention are fibers having an average diameter of less than 3,000 nanometers, or less than about 1,000 nanometers, or even less than about 500 nanometers. Additionally, it should be noted that here, as well as elsewhere in the text, ranges may be combined.

The length of the nanofibers used in the present invention is not critical and any length nanofiber can be used in the present invention. In one embodiment, the nanofibers used in the present invention are at least about 0.5 meters in length, or at least about 1 meter in length, or at least about 5 meters in length, or at least about 10 meters in length, or at least about 25 meters in length, or at least about 50 meters in length, or at least about 100 meters in length, or at least about 250 meters in length, or at least about 500 meters in length, or at least about 1 kilometer in length, or at least about. 3 kilometers in length, or at least about 5 kilometer in length, or even at least about 10 kilometer in length.

Suitable polymer compounds include any compound or composite compound (i.e., any mixture, emulsion, suspension, etc. of two or more compounds) that can be liquefied and used to form fibers and/or nanofibers in accordance with the present invention. Such compounds and/or composites include, but are not limited to, molten pitch, polymer solutions, polymer melts, polymers that are precursors to ceramics, molten glassy materials, and suitable mixtures thereof. Some preferred polymers include nylons, fluoropolymers, polyolefins, polyimides, polyesters, polycaprolactones, and other engineering polymers, or textile forming polymers.

The fibers/nanofibers of the present invention can be fabricated according to a variety of methods known in the art including, but not limited to, electrospinning, wet spinning, dry spinning, melt spinning, and gel spinning. Electrospinning is particularly suitable for fabricating fibers of the present invention inasmuch as it tends to produce the thinnest (i.e., finest denier) fibers of any of the foregoing methods. Typically electrospun fibers can be produced having very small diameters, usually on the order of about 3 nanometers to about 3000 nanometers. In another embodiment, electrospun fibers can be produced on order of about 10 nanometers to about 1,000 nanometers, or from about 10 nanometers to about 750 nanometers, or from about 10 nanometers to about 500 nanometers, or from about 10 nanometers to about 250 nanometers, or even on the order of about 10 nanometers to about 100 nanometers.

Another particularly effective method for fibers and/or nanofibers in accordance with the present invention comprises the nanofibers by gas jet method (i.e., NGJ method). This method has been previously described and is known in the art. Briefly, the method comprises using a device having an inner tube and a coaxial outer tube with a sidearm. The inner tube is recessed from the edge of the outer tube thus creating a thin film-forming region. A suitable fiber forming composition can be fed in through the sidearm and fills the empty space between the inner tube and the outer tube. The fiber forming composition continues to flow toward the effluent end of the inner tube until it contacts the effluent gas jet. The gas jet impinging on the melt surface creates a thin film of the fiber forming composition, which travels to the effluent end of tube where it is ejected forming a turbulent cloud of fibers/nanofibers.

Electrospinning and NGJ techniques permit the processing of suitable fiber forming compositions from both organic and aqueous solvents. Exemplary patents that disclose NGJ methods include U.S. Pat. Nos. 6,695,992; 6,520,425; and 6,382,526, all of which are incorporated by reference in their entireties. A suitable electrospinning process for producing nanofibers/fibers is disclosed in, for example, U.S. Pat. No. 6,753,454, which is hereby incorporated by reference for its teachings related to electrospinning of fibers/nanofibers.

As would be appreciated, the fiber forming compositions for use in the present invention can include one or more additives. Such additives include, but are not limited to, one or more absorbent compounds, one or more super absorbent compounds, one or more compounds that have a selective binding efficiency to one or more organic compounds, one or more compounds that have a selective binding efficiency to one or more water and/or water-based compounds, or mixtures of two or more thereof.

Suitable super absorbent compound for use in the present invention include any super absorbent compound that can hold more than about two times it own weight in water, those that can hold more than about three times their own weight in water, those that can hold more than about four times their own weight in water, those that can hold more than about five times their own weight in water, or those that can hold more than about seven times their own weight in water. In another embodiment, a super absorbent in accordance with the present invention is capable of absorbing an amount of a liquid equal to at least about 10 times its own weight, or at least about 15 times its own weight, or at least about 20 times its own weight, or at least about 25 times its own weight, or at least about 50 times its own weight, or at least about 75 times its own weight, or even at least about 100 times its own weight.

Suitable super absorbent compounds for use in conjunction with the present invention include, but are not limited to, organic polymers and porous clays. In another embodiment, the super absorbent compound of the present invention can be at least one compound selected from polyesters, polyethers, polyester-polyethers, polymers having pendant acids or pendant hydroxyls, polysiloxanes, polyacrylamides, Kaolins, Serpentines, Smectites, Glauconite, Chlorites, Vermiculites, Attapulgite, Sepiolite, Allophane and Imogolite, sodium polyacrylates, and 2-propenamide-co-2-propenoic acid.

Given the above, any compound that can hold less than about 2 times it own weight in water is typically considered an absorbent compound, rather than a super absorbent. In one embodiment, a suitable absorbent, or super absorbent, compound is present in an amount from about 1% weight in water (w/w) to about 85% (w/w) in the filtration medium, or in an amount from about 5% (w/w/) to about 50% (w/w) in the filtration medium, or even in the amount from about 30% (w/w) to about 50% (w/w) in the filtration medium.

As is discussed above, fibers in accordance with the present invention can be formed by an NGJ process. To this end, one such exemplary process is described below. However, it should be noted that the present invention is not limited to solely this NGJ process, other suitable NGJ and/or electrospinning processes could also be employed to produce the fibers disclosed herein.

A nozzle 10 that is employed in practicing an NGJ process that can be used to produce fibers/nanofibers in accordance with the present invention is best described with reference to FIG. 1. Nozzle 10 includes a center tube 11 having an entrance orifice 26 and an outlet orifice 15. The diameter of center tube 11 can vary based upon the need for gas flow, which impacts the velocity of the gas as it moves a film of liquid across the jet space 14, as will be described below. In one embodiment, the diameter of tube 11 is from about 0.5 to about 10 mm, or even from about 1 to about 2 mm. Likewise, the length of tube 11 can vary depending upon construction conveniences, heat flow considerations, and shear flow in the fluid. In one embodiment, the length of tube 11 will be from about 1 to about 20 cm, or even from about 2 to about 5 cm. Positioned concentrically around and apart from the center tube 11 is a supply tube 12, which has an entrance orifice 27 and an outlet orifice 16. Center tube 11 and supply tube 12 create an annular space or column 13. This annular space or column 13 has a width, which is the difference between the inner and outer diameter of the annulus, that can vary based upon the viscosity of the fluid and the maintenance of a suitable thickness of fiber-forming material fluid on the inside wall of gas jet space 14. In one embodiment, the width is from about 0.05 to about 5 mm, or even from about 0.1 to about 1 mm. Center tube 11 is vertically positioned within supply tube 12 so that a gas jet space 14 is created between lower end 24 of center tube 11 and lower end 23 of supply tube 12. The position of center tube 11 is adjustable relative to lower end 23 of supply tube 12 so that the length of gas jet space 14 is adjustable. Gas jet space 14, i.e., the distance between lower end 23 and lower end 24, is adjustable so as to achieve a controlled flow of fluid along the inside of tube 12, and optimal conditions for nanofiber production at the end 23 of tube 12. In one embodiment, this distance is from about 0.1 to about 10 mm, or even from about 1 to about 2 mm. It should be understood that gravity will not impact the operation of the apparatus of this invention, but for purposes of explaining the present invention, reference will be made to the apparatus as it is vertically positioned as shown in the Figures.

It should be appreciated that the supply tube outlet orifice 16 and gas jet space 14 can have a number of different shapes and patterns. For example, the space 14 can be shaped as a cone, bell, trumpet, or other shapes to influence the uniformity of fibers launched at the orifice. The shape of the outlet orifice 16 can be circular, elliptical, scalloped, corrugated, or fluted. Still further, the inner wall of supply tube 12 can include slits or other manipulations that may alter fiber formation. These shapes influence the production rate and the distribution of fiber diameters in various ways.

According to the present invention, nanofibers are produced by using the apparatus of FIG. 1 by the following method. Fiber-forming material that includes therein the necessary fiber forming components is provided by a source 17, and fed through annular space 13. The fiber-forming material is directed into gas jet space 14. Simultaneously, pressurized gas is forced from a gas source 18 through the center tube 11 and into the gas jet space 14.

Within gas jet space 14 it is believed that the fiber-forming material is in the form of an annular film. In other words, fiber-forming material exiting from the annular space 13 into the gas jet space 14 forms a thin layer of fiber-forming material on the inside wall of supply tube 12 within gas jet space 14. This layer of fiber-forming material is subjected to shearing deformation by the gas jet exiting from center tube outlet orifice 15 until it reaches the fiber-forming material supply tube outlet orifice 16. At this point, it is believed that the layer of fiber-forming material is blown apart into many small strands 29 by the expanding gas and ejected from orifice 16 as shown in FIG. 1. Once ejected from orifice 16, these strands solidify and form nanofibers. This solidification can occur by cooling, chemical reaction, coalescence, ionizing radiation or removal of solvent.

As noted above, the fibers produced according to this process are nanofibers and have an average diameter that is less than about 3,000 nanometers, or from about 3 to about 1,000 nanometers, or even from about 10 to about 500 nanometers. The diameter of these fibers can be adjusted by controlling various conditions including, but not limited to, temperature and gas pressure. The length of these fibers can widely vary to include fibers that are as short as about 0.01 mm up to those fibers that are about many km in length. Within this range, the fibers can have a length from about 1 mm to about 1 km, and more narrowly from about 1 cm to about 1 mm. The length of these fibers can be adjusted by controlling the solidification rate.

As discussed above, pressurized gas is forced through center tube 11 and into jet space 14. This gas should be forced through center tube 11 at a sufficiently high pressure so as to carry the fiber forming material along the wall of jet space 14 and create nanofibers. Therefore, in one embodiment, the gas is forced through center tube 11 under a pressure of from about 10 to about 5,000 pounds per square inch (psi), or even from about 50 to about 500 psi.

The term gas as used throughout this specification includes any gas. Non-reactive gases are preferred. Such a term refers to those gases, or combinations thereof, that will not deleteriously impact the fiber-forming material. Examples of these gases include, but are not limited to, nitrogen, helium, argon, air, carbon dioxide, steam fluorocarbons, fluorochlorocarbons, and mixtures thereof. It should be understood that for purposes of this specification, gases will also refer to those super heated liquids that evaporate at the nozzle when pressure is released, e.g., steam. It should further be appreciated that these gases may contain solvent vapors that serve to control the rate of drying of the nanofibers made from polymer solutions. Still further, useful gases include those that react in a desirable way, including mixtures of gases and vapors or other materials that react in a desirable way. For example, it may be useful to employ gas streams that include molecules that serve to crosslink polymers. Still further, it may be useful to employ gas streams that include metals that serve to improve the production of fibers/nanofibers.

Figure 2:
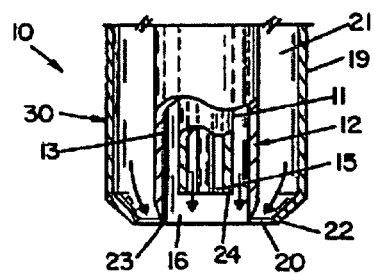
FIG. 2 is a schematic representation of one embodiment of an apparatus that can be used to produce ceramic nanofibers in accordance with the present invention, wherein the apparatus includes a lip cleaner assembly.
Figure 3:
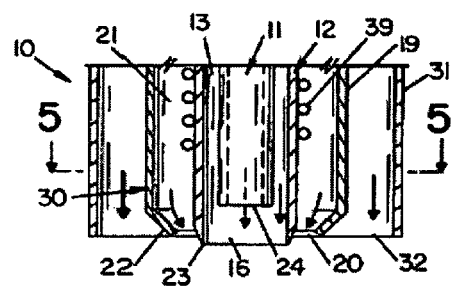
FIG. 3 is a schematic representation of one embodiment of an apparatus that can be used to produce ceramic nanofibers in accordance with the present invention, wherein the apparatus includes an outer gas shroud assembly.
Figure 4:
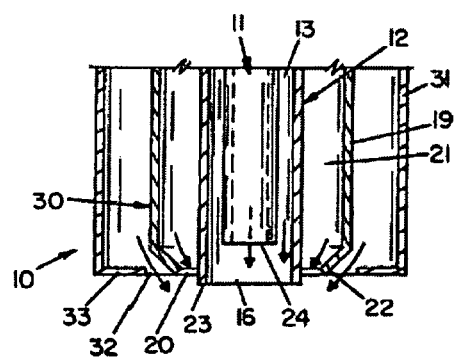
FIG. 4 is a schematic representation of one embodiment of an apparatus that can be used to produce ceramic nanofibers in accordance with the present invention, wherein the apparatus includes an outer gas shroud, and the shroud is modified with a partition.

In another embodiment, as is shown in FIG. 2, nozzle 10 further comprises a lip cleaner 30. Within this assembly, an outer gas tube 19 is positioned concentrically around and apart from supply tube 12. Outer gas tube 19 extends along supply tube 12 and thereby creates a gas annular column 21. Lower end 22 of outer gas tube 19 and lower end 23 of supply tube 12 form lip cleaner orifice 20. In one embodiment, lower end 22 and lower end 23 are on the same horizontal plane (flush) as shown in FIG. 2. In another embodiment, however, lower ends 22 and 23 may be on different horizontal planes as shown in FIGS. 3 and 4. As also shown in FIG. 2, outer gas tube 19 preferably tapers and thereby reduces the size of annular space 21. Pressurized gas is forced through outer gas tube 19 and exits from outer gas tube 19 at lip cleaner orifice 20, thereby preventing the build up of residual amounts of fiber-forming material that can accumulate at lower end 23 of supply tube 12. The gas that is forced through gas annular column 21 should be at a sufficiently high pressure so as to prevent accumulation of excess fiber-forming material at lower end 23 of supply tube 12, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 15, and therefore lip cleaner 30 of this environment serves both to clean the lip and control the flow of exiting fiber strands.

Figure 5:
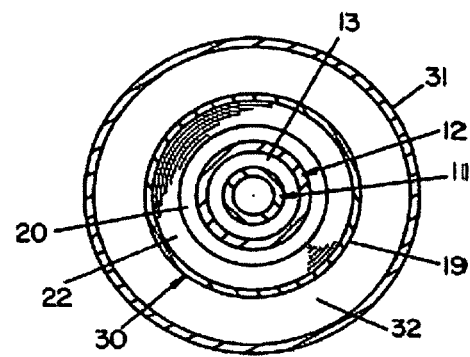
FIG. 5 is a cross sectional view taken along line 5-5 of the embodiment shown in FIG. 3.

In yet another embodiment, which is shown in FIGS. 3, 4 and 5, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas controls the cooling rate, solvent evaporation rate of the fluid, or the rate chemical reactions occurring within the fluid. It should be understood that the general shape of the gas shroud is controlled by the width of the annular tube orifice 32 and its vertical position with respect to bottom 23 of tube 12. The shape is further controlled by the pressure and volume of gas flowing through the shroud. It should be further understood that the gas flowing through the shroud is preferably under a relatively low pressure and at a relatively high volume flow rate in comparison with the gas flowing through center tube 11.

In one embodiment, shroud gas tube orifice 32 is in an open configuration, as shown in FIG. 3. In another embodiment, as shown in FIG. 4, orifice 32 is in a constricted configuration, wherein the orifice is partially closed by a shroud partition 33 that adjustably extends from shroud gas tube 31 toward lower end 23.

Figure 6:
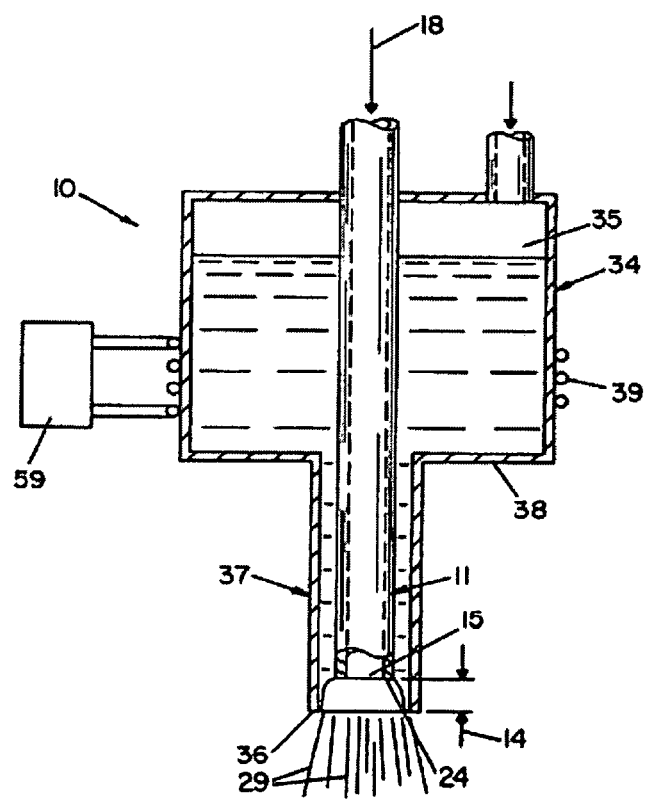
FIG. 6 is a schematic representation of one embodiment of an apparatus that can be used to produce ceramic nanofibers in accordance with the present invention, wherein the apparatus is designed for batch processes.

In practicing the present invention, a spinnable fluid or fiber-forming material can be delivered to annular space 13 by several techniques. For example, and as shown in FIG. 6, the fiber-forming material can be stored within nozzle 10. This is especially useful for batch operations. As with the previous embodiments, nozzle 10 will include a center tube 11. Positioned, preferably concentrically, around center tube 11 is a fiber-forming material container 34, comprising container walls 38, and defining a storage space 35. The size of storage space 35, and therefore the volume of spinnable fluid stored within it, will vary according to the particular application to which the present invention is put. Fiber-forming material container 34 further comprises a supply tube 12. Center tube 11 is inserted into fiber-forming material container 34 in such a way that a center tube outlet orifice 15 is positioned within the outlet tube 37, creating a gas jet space 14 between the lower end 24 of center outlet 11 and the lower end 36 of outlet tube 37. The position of center tube 11 is vertically adjustable relative to lower end 36 so that the length of the gas jet space 14 is likewise adjustable. As with previously described embodiments, gas jet space 14, i.e., the distance between lower end 36 and lower end 24, is adjustable so as to achieve a uniform film within space 14 and thereby produce uniform fibers with small diameters and high productivity. In one embodiment, this distance is from about 1 to about 2 mm, or even from about 0.1 to about 5 mm. The length of outlet tube 37 can be varied according to the particular application of the present invention. If container wall 38 is of sufficient thickness, such that a suitable gas jet space can be created within wall 38, then outlet tube 37 may be eliminated.

According to this embodiment, nanofibers are produced by using the apparatus of FIG. 6 according to the following method. Pressure is applied to the container so that fiber-forming material is forced from storage space 35 into gas jet space 14. The pressure that is applied can result from gas pressure, pressurized fluid, or molten polymer from an extruder. Simultaneously, pressurized gas is forced from a gas source 18, through center tube 11, and exits through center tube orifice 15 into gas jet space 14. As with previous embodiments, heat may be applied to the fiber-forming material prior to or after being placed in fiber-forming material container 34, to the pressurized gas entering center tube 11, and/or to storage space 35 by heat source 39 or additional heat sources. Fiber-forming material exiting from storage space 35 into gas jet space 14 forms a thin layer of fiber-forming material on the inside wall of gas jet space 14. This layer of fiber-forming material is subjected to shearing deformation, or other modes of deformation such as surface wave, by the gas jet until it reaches container outlet orifice 36. There the layer of fiber-forming material is blown apart, into many small strands, by the expanding gas.

Figure 7:
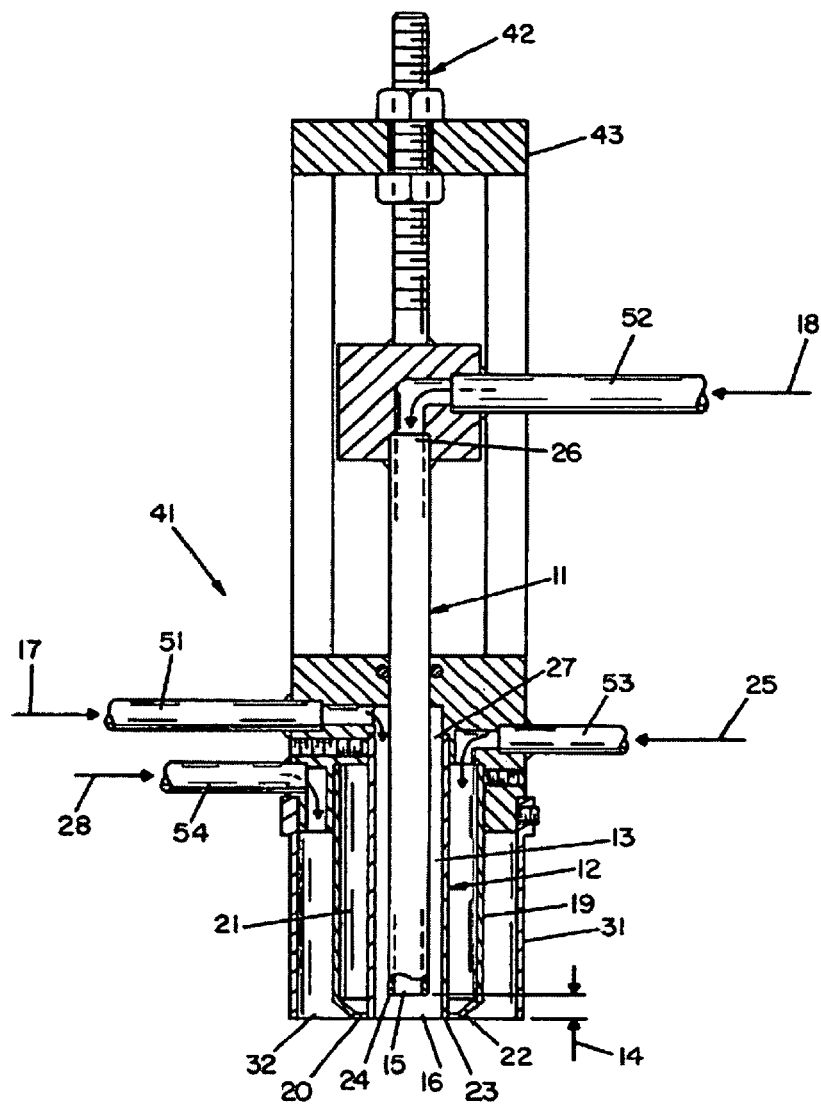
FIG. 7 is a schematic representation of one embodiment of an apparatus that can be used to produce ceramic nanofibers in accordance with the present invention, wherein the apparatus is designed for continuous processes.

In still another embodiment, as shown in FIG. 7, the fiber-forming material can be delivered on a continuous basis rather than a batch basis as in FIG. 6. In this embodiment, the apparatus is a continuous flow nozzle 41. Consistent with previous embodiments, nozzle 41 comprises a center tube 11, a supply tube 12, an outer gas tube 19, and a gas shroud tube 31. Supply tube 12 is positioned concentrically around center tube 11. Outer gas tube 19 is positioned concentrically around supply tube 12. Gas shroud tube 31 is positioned concentrically around outer gas tube 19. Center tube 11 has an entrance orifice 26 and an outlet orifice 15. As in previous embodiments, the diameter of center tube 11 can vary. In one embodiment, the diameter of tube 11 is from about 1 to about 20 mm, or even from about 2 to about 5 mm. Likewise the length of tube 11 can vary. In one embodiment, the length of tube 11 will be from about 1 to about 10 cm, or even from about 2 to about 3 cm.

Positioned concentrically around the center tube 11 is a supply tube 12 that has an entrance orifice 27 and an outlet orifice 16. The center tube 11 and supply tube 12 create an annular space or column 13. This annular space or column 13 has a width, that can vary, which is the difference between the inner and outer diameter of the annulus. In a one embodiment, the width is from about 0.05 to about 5 mm, or even from about 0.1 to about 1 mm.

Center tube 11 is vertically positioned within the supply tube 12 so that a gas jet space 14 is created between the lower end 24 of center tube 11 and the lower end 23 of supply tube 12. The position of center tube 11 is adjustable relative to supply tube outlet orifice 16 so that the size of gas jet space 14 is adjustable. As with previously embodiments, the gas jet space 14, i.e., the distance between lower end 23 and lower end 24, is adjustable. In one embodiment this distance is from about 0.1 to about 10 mm, or even from about 1 to about 2 mm.

Center tube 11 is attached to an adjustment device 42 that can be manipulated such as by mechanical manipulation. In one particular embodiment as shown in FIG. 7, the adjustment device 42 is a threaded rod that is inserted through a mounting device 43 and is secured thereby by a pair of nuts threaded onto the rod.

In this embodiment, supply tube 12 is in fluid tight communication with supply inlet tube 51. Center tube 11 is in fluid tight communication with pressurized gas inlet tube 52, outer gas tube 19 is in fluid tight communication with the lip cleaner gas inlet tube 53, and gas shroud tube 31 is in fluid tight communication with shroud gas inlet tube 54. This fluid tight communication is achieved by use of a connector, but other means of making a fluid tight communication can be used, as known by those skilled in the art.

According to the present invention, nanofibers are produced by using the apparatus of FIG. 7 by the following method. Fiber-forming material is provided by a source 17 through supply inlet tube 51 into and through annular space 13, and then into gas jet space 14. In one embodiment, the fiber-forming material is supplied to the supply inlet tube 51 under a pressure of from about 0 to about 15,000 psi, or even from about 100 to about 1,000 psi. Simultaneously, pressurized gas is forced through inlet tube 52, through center tube 11, and into gas jet space 14. As with previously described embodiments, it is believed that fiber-forming material is in the form of an annular film within gas jet space 14. This layer of fiber-forming material is subjected to shearing deformation by the gas jet exiting from the center tube outlet orifice 15 until it reaches the fiber-forming material supply tube outlet orifice 16. At this point, it is believed that the layer of fiber-forming material is blown apart into many small strands by the expanding gas. Once ejected from orifice 16, these strands solidify in the form of nanofibers. This solidification can occur by cooling, chemical reaction, coalescence, ionizing radiation or removal of solvent. As with previously described embodiments also simultaneously, pressurized gas is supplied by gas source 25 to lip cleaner inlet tube 53 into outer gas tube 19.

As with previous embodiments, the outer gas tube 19 extends along supply tube 12 and thereby creates an annular column of gas 21. The lower end 22 of gas annular column 21 and the lower end 23 of supply tube 12 form a lip cleaner orifice 20. In this embodiment, lower end 22 and lower end 23 are on the same horizontal plane (flush) a shown in FIG. 7. As noted above, however, lower ends 22 and 23 may be on different horizontal planes. The pressurized of gas exiting through lip cleaner orifice 20 prevents the buildup of residual amounts of fiber-forming material that can accumulate at lower end 23 of supply tube 12. Simultaneously, pressurized gas is supplied by gas source 28 through shroud gas inlet tube 54 to shroud gas tube 31. Pressurized gas is forced through the shroud gas tube 31 and it exits from the shroud gas tube orifice 32 thereby creating a shroud of gas around the nanofibers that control the cooling rate of the nanofibers exiting from tube orifice 16. In one particular embodiment, fiber-forming material is supplied by an extruder.

A mixture of nanofibers can be produced from the nozzles shown in FIG. 8 through 14. In these embodiments, a plurality of gas tubes and supply tubes are concentrically positioned in an alternating manner such that a plurality of gas jet spaces are created. In previously described embodiments, a single supply tube and a single gas tube create a single gas jet space.

Figure 8:
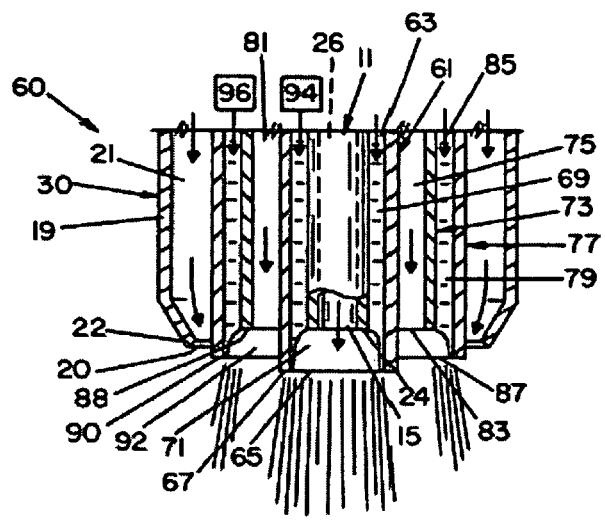
FIG. 8 is a schematic representation of one embodiment of an apparatus that can be used to produce ceramic nanofibers in accordance with the present invention, wherein the apparatus is designed for the production of a mixture of nanofibers from one or more polymers simultaneously.

As shown in FIG. 8, nozzle 60 includes a center tube 11 having an entrance orifice 26 and an outlet orifice 15. The diameter of center tube 11 can vary based upon the need for gas flow. Center tube 11 may be specifically adapted to carry a pressurized gas. Positioned concentrically around center tube 11 is a first supply tube 61 that has an entrance orifice 63 and an exit orifice 65. Center tube 11 and first supply tube 61 create a first supply annular space or column 69. First supply tube 61 may be specifically adapted to carry a fiber-forming material. Furthermore, center tube 11 and first supply tube 61 may be positioned such that they are essentially parallel to each other.

As with previous embodiments, center tube 11 is positioned within first supply tube 61 so that a first gas jet space 71 is created between the lower end 24 of center tube 11 and the lower end 67 of first supply tube 61. The position of center tube 11 may be adjustable relative to lower end 67 of first supply tube 61 so that the length of first gas jet space 71 is adjustable. Also, the width of first supply annular space or column 69 can be varied to accommodate the viscosity of the fluid and the maintenance of a suitable thickness of fiber-forming material on the inside wall of first gas jet space 71.

Nozzle 60 also has a middle gas tube 73 positioned concentrically around and apart from first supply tube 61. Middle gas tube 73 extends along first supply tube 61 and thereby creates a middle gas annular column 75. Middle gas tube 73 has an entrance orifice 81 and an exit orifice 83.

Unlike previous embodiments, a second supply tube 77 is positioned concentrically around middle gas tube 73, which creates a second supply annular space or column 79. Second supply tube 77 has an entrance orifice 85 and an exit orifice 87. As with first supply tube 61, second supply tube 77 may be specifically adapted to carry a fiber forming material. Middle gas tube 73 is positioned within second supply tube 77 so that a second gas jet space 92 is created between the lower end 88 of middle gas tube 73 and the lower end 90 of second supply tube 77. The position of middle gas tube 73 may be adjustable relative to lower end 90 of second supply tube 77 so that the length of second gas jet space 92 is adjustable. The dimensions of first and second gas jet spaces, 71 and 92 respectively, are adjustable in order to achieve a controlled flow of fiber-forming material along the inside of first supply tube 61 and second supply tube 77, and thereby provide optimal conditions for nanofiber production at ends 67 and 90 of tubes 61 and 77. In one embodiment, the distance between ends 88 and 90, and between ends 24 and 67, is from about 0.1 to about 10 mm, or even from about 1 to about 2 mm. In one example of this embodiment, lower end 90 and lower end 67 are on different horizontal planes as shown in FIG. 8. In another example of this embodiment, lower end 90 is on the same horizontal plane (flush) as lower end 67 (not shown).

Figure 9:
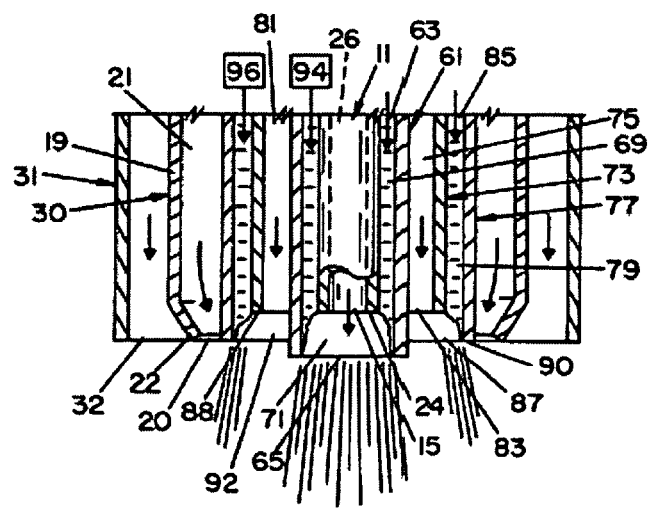
FIG. 9 is a schematic representation of one embodiment of an apparatus that can be used to produce ceramic nanofibers in accordance with the present invention, wherein the apparatus includes an outer gas shroud assembly.
Figure 10:
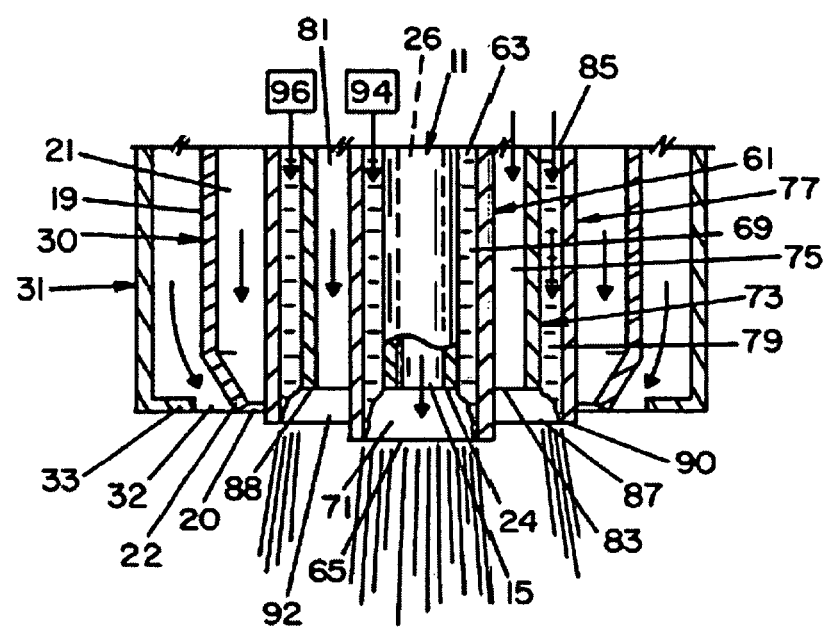
FIG. 10 is a schematic representation of another embodiment of an apparatus that can be used to produce ceramic nanofibers in accordance with the present invention, wherein the apparatus includes an outer gas shroud, having a partition directed radially inward at an end thereof.

For purposes of clarity, the present embodiments as shown in FIGS. 8 through 10 feature two supply tubes and corresponding gas supply tubes, but it is envisioned that any multiple of supply tubes and gas tubes can be positioned concentrically around center tube 11 in the same repeating pattern as described above.

Nozzle 60 optionally further comprises a lip cleaner 30, as shown in FIG. 8. Lip cleaner 30 comprises an outer air tube 19 positioned concentrically around and apart from second supply tube 77, as shown in FIG. 8, or concentrically around the outermost supply tube if more than two supply tubes are present as mentioned above. Outer gas tube 19 extends along second supply tube 77 and thereby creates a gas annular column 21. A lower end 22 of outer gas tube 19 and lower end 90 of second supply tube 77 form lip cleaner orifice 20. As in previous embodiments, lower ends 22 and 90 may also be on different horizontal planes as shown in FIG. 8, or lower end 22 may be on the same horizontal plane (flush) as lower end 90 as shown in FIG. 9. As shown in FIGS. 8 through 10, outer gas tube 19 preferably tapers and thereby reduces the size of annular space 21 at lower end 22.

Nanofibers are produced by using the apparatus of FIG. 8 by the following method. A first fiber-forming material is provided by a first material source 94, and fed through first annular space 69 and directed into first gas jet space 71. Pressurized gas is forced from a gas source through the center tube 11 and into first gas jet space 71. This gas should be forced through center tube 11 at a sufficiently high pressure so as to carry the fiber forming material along the wall of jet space 71 and create nanofibers, as mentioned in previous embodiments. A second fiber-forming material may be provided by the first material source (not shown) or by a second material source 96, and fed through second supply annular space 79. The second fiber-forming material is directed into second gas jet space 92. Pressurized gas is forced from a source through middle gas annular column 75 and into second gas jet space 92. This gas should be forced through middle gas annular column 75 at a sufficiently high pressure so as to carry the fiber forming material along the wall of jet space 92 and create nanofibers, as mentioned in previous embodiments. Therefore, in one embodiment, the gas is forced through center tube 11 and middle gas tube 73 under a pressure of from about 10 to about 5,000 psi, or even from about 50 to about 500 psi.

Pressurized gas is also forced through outer gas tube 19 and exits from outer gas tube 19 at lip cleaner orifice 20, thereby preventing the build up of residual amounts of fiber-forming material that can accumulate at lower end 90 of supply tube 77. The gas flow through lip cleaner orifice 20 also affects the exit angle of the strands of fiber-forming material exiting from exit orifice 87, and therefore lip cleaner 30 of this environment serves both to clean the lip and control the flow of exiting fiber strands. In a similar manner, the gas exiting second supply tube exit orifice 87 also serves to clean lower end 67 of first supply tube 61 and controls the flow of fiber strands exiting from first supply tube 61. In this way, each gas tube functions as a lip cleaner for the supply tube that is concentrically interior to it.

The gas that is forced through gas annular column 21 should be at a sufficiently high pressure so as to prevent accumulation of excess fiber-forming material at lower end 90 of second supply tube 77, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 15, and therefore lip cleaner 30 of this environment serves both to clean the lip and control the flow of exiting fiber strands.

In similar embodiments, which are shown in FIGS. 9 and 10, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas can control the solidification rate of the fiber-forming material by, for example influencing the cooling rate of a molten fiber-forming material, the solvent evaporation rate of the fiber-forming material, or the rate of chemical reactions occurring within the fiber-forming material. It should be understood that the general shape of the gas shroud is controlled by the width of the annular tube orifice 32 and its vertical position with respect to lower end 22 of outer gas tube 19. The shape is further controlled by the pressure and volume of gas flowing through the shroud. It should be further understood that the gas flowing through the shroud is, in one instance, under a relatively low pressure and at a relatively high volume flow rate in comparison with the gases flowing through center tube 11 and middle gas tube 73.

In one embodiment, shroud gas tube orifice 32 is in an open configuration, as shown in FIG. 9. In another embodiment, as shown in FIG. 10, orifice 32 is in a constricted configuration, wherein the orifice is partially closed by a shroud partition 33 that may adjustably extend radially inward from shroud gas tube 31 toward lower end 23.

It should be understood that there are many conditions and parameters that will impact the formation of fibers, and specifically the fibers/nanofibers, according to the present invention. For example, the pressure of the gas moving through any of the columns of the apparatus of this invention may need to be manipulated based on the fiber-forming material that is employed. Also, the fiber/nanofiber-forming material being used or the desired characteristics of the resulting fiber/nanofiber may require that the fiber-forming material itself or the various gas streams be heated. For example, the length of the nanofibers can be adjusted by varying the temperature of the shroud air. Where the shroud air is cooler, thereby causing the strands of fiber-forming material to quickly freeze or solidify, longer nanofibers can be produced. On the other hand, where the shroud air is hotter, and thereby inhibits solidification of the strands of fiber-forming material, the resulting nanofibers will be shorter in length. It should also be appreciated that the temperature of the pressurized gas flowing through center tube 11 and middle gas tube 73 can likewise be manipulated to achieve or assist in these results.

Those skilled in the art will be able to heat the various gas flows using techniques that are conventional in the art. Likewise, the fiber/nanofiber-forming material can be heated by using techniques well known in the art. For example, heat may be applied to the fiber/nanofiber-forming material entering the supply tube, to the pressurized gas entering the center tube, or to the supply tube itself by a heat source 39, as shown in FIGS. 3 and 6, for example. In one particular embodiment, as shown in FIG. 6, heat source 39 can include coils that are heated by a source 59.

As would be appreciated upon reading and understanding the process of the present invention, after NGJ production of composite nanofibers is complete, such nanofibers are subjected to a heating step, as is described above, to yield flexible fibers/nanofibers in accordance with one or more embodiments of the present invention.

In another embodiment, NGJ can be combined with electrospinning techniques. In these combined process, NGJ improves the production rate while the electric field maintains the optimal tension in the jet to produce orientation and avoid the appearance of beads on the fibers/nanofibers. The electric field also provides a way to direct the nanofibers along a desired trajectory through processing machinery, heating ovens, or to a particular position on a collector/sheet. Electrical charge on the fiber/nanofiber can also produce looped and coiled nanofibers that can increase the bulk of the non-woven fabric made from these fibers/nanofibers.

Figure 11:
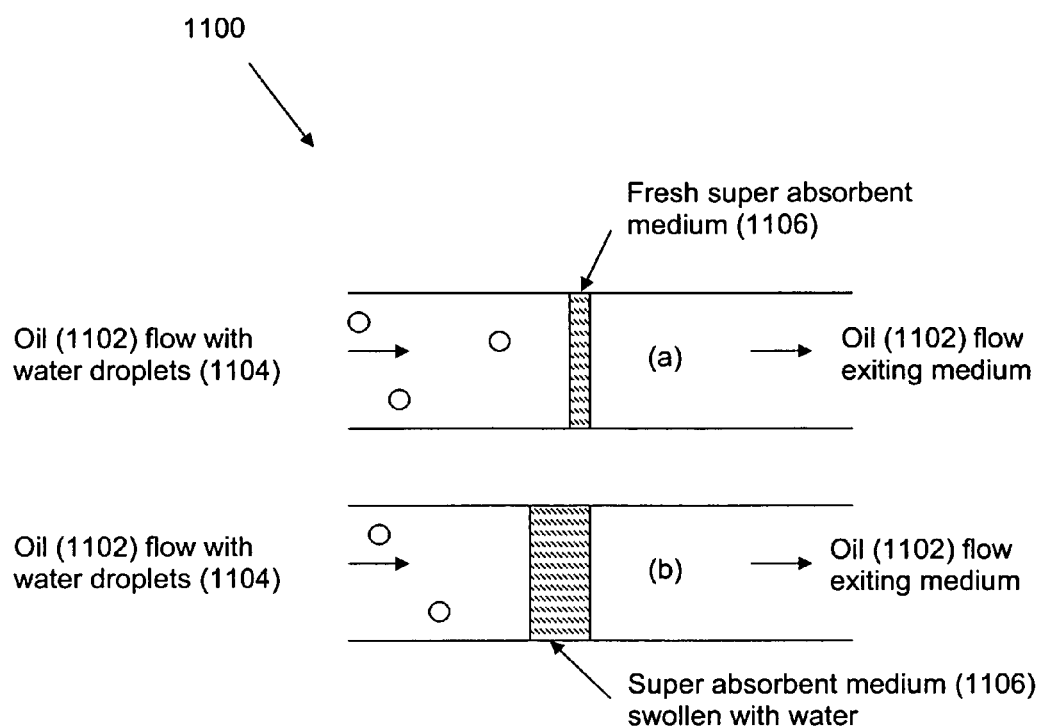
FIG. 11(*a*) is an illustration of one possible method formed in accordance with an embodiment of the present invention that is designed to remove water and/or a water-based compound from an organic liquid.

FIG. 11(*a*) illustrates a filtration configuration 1100 in which oil 1102 laden with, for example, water droplets 1104 must pass through a super absorbent mat 1106. The fresh medium 1106 is thin, but as it collects water droplets 1104 mat 1106 swells (see FIG. 11(*b*)). Mat 1106 is expected to capture and hold nearly 100% of the water droplets 1104 until an amount of water equal to more than 40 times the mass of the super absorbent is captured by mat 1106.

Figure 12:
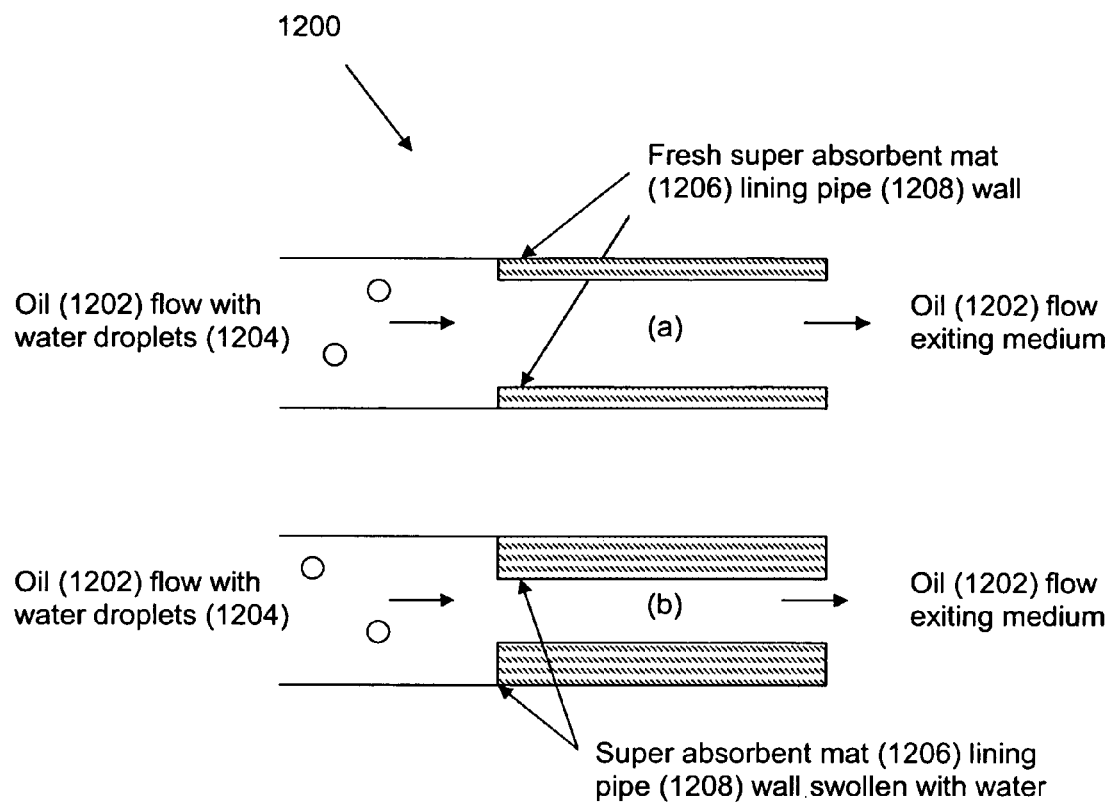
FIG. 12(*a*) is an illustration of another possible method formed in accordance with an embodiment of the present invention that is designed to remove water and/or a water-based compound from an organic liquid.

FIG. 12 illustrates a cross-flow filtration configuration 1200 in which oil 1202 laden with, for example, water droplets 1204 must pass through a super absorbent mat 1206. The fresh medium 1206 is thin, but as it collects water droplets 1204 mat 1206 swells (see FIG. 12(*b*)). Mat 1206 is expected to capture and hold nearly 100% of the water droplets 1204 until an amount of water equal to more than 40 times the mass of the super absorbent is captured by mat 1206. In this embodiment, mat 1206 is attached to the walls of a pipe 1208. Water droplets 1204 in oil 1202 are captured by mat 1206 when droplets 1204 come into contact with the super absorbent material contained in mat 1206 due to diffusion, inertial, or turbulent mechanisms. The efficiency of the water droplet capture in this configuration will depend upon the oil flow rate, the diameter of pipe 1208, and the length of mat 1206.

Figure 13:
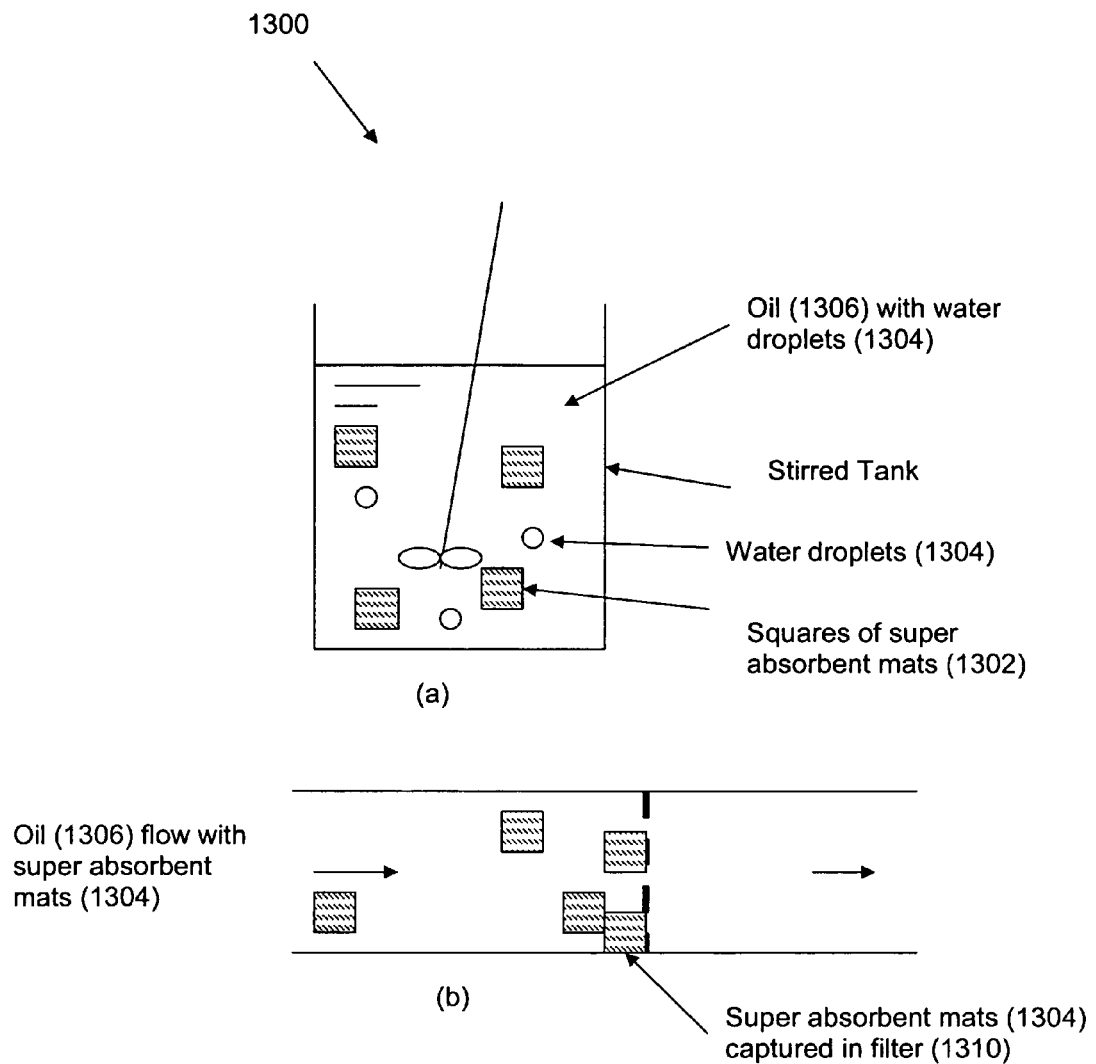
FIG. 13(*a*) is an illustration of yet another possible method formed in accordance with an embodiment of the present invention that is designed to remove water and/or a water-based compound from an organic liquid.

Alternatively, super absorbent mats (or other configuration) can be inserted into stirred tank to adsorb any water and/or water droplets present (see embodiment 1300 of FIG. 13(*a*)). The stirring action brings mats 1302 into contact with water droplets 1304 contain in, for example, oil 1306. After a sufficient period of time for removal of substantially all the water from oil 1306, oil 1306 is pumped out of the tank and through a large mesh filter 1310 (see FIG. 13(*b*)) to remove from the organic liquid mats 1302. Since mats 1302 are structurally strong they are easily separated from oil 1306 (see FIG. 13(*b*)). In this embodiment, water is retained by the mats and thus removed from the oil, or captured mechanically on the blades of a stirrer or a "raking" device. Although the embodiment of FIGS. 13(*a*) and 13(*b*) shows square mats, the present invention is not limited thereto. Instead, any shape of mat or non-woven material can be utilized herein so long as the material is capable of absorbing water and/or water-based compounds.

As a variation on the embodiment of FIGS. 13(*a*) and 13(*b*), instead of mats, nanofibers with at least one super absorbent material therein, thereon, or thereabout can be added to the stirred tank as loose fibers (not formed in structural mats). The fibers are stirred into the oil using, for example, gas jets to contact and adsorb the water. Like the mats, the fibers can be filtered from the oil phase to remove the water from the oil.

Sheets of nanofibers, preferable made of elastomeric substances such as "Viton"® fluoropolymer elastomers, or epichlorohydrin elastomers that are commonly used in flexible tubing for fuel systems, or as liners in fuel tanks, can be fabricated into containers such as envelopes, tea bags, or packages. The containers can be filled with hydrophilic super absorbent particles. These particles may be neat super absorbent particles, or be mounted in, on, or among nanofibers, thin sheets, or foam like structures with open pores.

The above examples are not meant to be limiting, as would be apparent to one of ordinary skill in the art similar materials and structures are included within the scope of this disclosure.

In another embodiment, the present invention relates to structures for use for capturing oil-like fluids from water-like fluids. Such structures can be designed and made by reversing the roles of the hydrophobic substances and the hydrophilic substances in the examples above. Elastomeric substances filled with particles that absorb oils could be used in ways analogous to those described above, to remove oil from water that contained dispersed or dissolved oils, or water coated with a layer of oil on its surface due, for example to oil spills or oily contamination from pumps. For example, bundles of polyacrylonitrile nanofibers, with their high surface area per unit mass, are very effective for removing oil films from the surface of water.

In still another embodiment, the present invention relates to mechanically strong absorbent materials. More particularly such materials comprise at least one hydrophilic elastomeric fibrous component (HEFC) and at least one absorbent component (i.e., absorbent compound). The absorbent component is generally in physical proximity to the HEFC resulting in fluid communication therewith. In one embodiment, mats formed from at least one hydrophilic elastomeric fibrous component (HEFC) and at least one absorbent component in accordance with the present invention remain substantially strong when wet. The amount of strength needed in such mats depend in large part on the apparatus and/or method in which such mats are utilized. Additionally, it should be noted that the present invention is not limited to just mat embodiments. Rather, any shape of fibers and/or nanofibers made from a combination of at least one hydrophilic elastomeric fibrous component (HEFC) and at least one absorbent component can be used in conjunction with the methods and/or apparatuses of the present invention. Further, the present invention has a high capacity for absorption, while maintaining a high absorption rate.

In general, the system of this embodiment operates in the following manner: the HEFC absorbs a liquid and transfers it to the absorbent component where the fluid remains entrapped. More particularly, fluids may enter the present invention at any physical point including via the absorbent material or via the HEFC, or both. However, since the absorbent component preferably has a greater capacity for holding liquids than the HEFC, and since the absorbent component generally absorbs more slowly than the HEFC, there tends to be a net fluid flow from the HEFC to the absorbent component. Accordingly, the HEFC tends to behave in the manner of a wick inasmuch as it takes in and delivers liquids to the absorbent component.

Any hydrophilic elastomeric material may be used as the HEFC provided it is capable of (1) being spun into fibers, and (2) absorbing and wicking liquids. Preferably, such a material is also capable of withstanding the strain that results from dimensional changes of the absorbent component. Materials within the scope of the present invention may be blends, mixtures or solid solutions of elastomerogenic and hydrophilogenic subcomponents. Alternatively, such materials may be copolymers of elastomeric polymers and hydrophilic polymers, e.g., random copolymers, block copolymers, and the like. Still further materials within the scope of the present invention include homopolymers wherein the polymer is both hydrophilic and elastomeric. Specific materials within the scope of the present invention include without limitation zein protein, polyester elastomers, polydimethylsiloxane, hydrophilic poly(ether-co-ester) elastomers, silicone-co-polyethyleneglycol elastomers, polyacrylates, thermoplastic polyurethanes, poly(ether-co-urethanes), and polyurethanes. Preferred materials include without limitation poly(ether-co-urethanes), and polyurethanes.

Any absorbent material may be used as the absorbent component of the present invention provided it is capable of being in physical proximity to the HEFC resulting in fluid communication therewith. Generally, this means that the material must be wettable by an aqueous or otherwise polar liquid. More particularly, materials within the scope of the present invention preferably have a greater liquid holding capacity per unit mass than the HEFC. In contrast to the HEFC, no particular morphology is necessary to the operation of the absorbent component. For example, the absorbent component may be without limitation amorphous, globular, elongated, fibrous, azimuthal, ellipsoidal, or spherical. Moreover, no particular stress-strain relationship is necessary to the performance of the absorbent material. Thus, the absorbent material may be without limitation substantially rigid, pliable, elastic, gelatinous, fluid or brittle. Absorbent materials include without limitation polyesters, polyethers, polyester-polyethers, polymers having pendant acids or pendant hydroxyls, polysiloxanes, polyacrylamides, Kaolins, Serpentines, Smectites, Glauconite, Chlorites, Vermiculites, Attapulgite, Sepiolite, Allophane and Imogolite, sodium polyacrylates, and 2-propenamide-co-2-propenoic acid. Preferred materials include without limitation sodium polyacrylates, and 2-propenamide-co-2-propenoic acid.

The absorbent material may have any of a variety of absorbencies; however, preferably the absorbent material has a greater absorbency than the HEFC. More preferably, the absorbent material is a super absorbent.

The absorbent component may be distributed in any manner provided it is in physical proximity resulting in fluid communication with the HEFC. For instance, the absorbent material may be coated to the surface of the HEFC. More specifically, it may be physisorbed or chemisorbed to the surface of the HEFC, or it may be affixed to the surface in any other appropriate manner. In another example, the absorbent material may be mechanically entrapped or entangled in the hydrophilic elastomeric fibers. Alternatively, the absorbent component may be embedded in the HEFC. Additionally, any combination of the foregoing arrangements is also within the scope of the present invention.

Any of the foregoing distributions may be preferred depending upon the physical properties of the absorbent component. For instance, if the absorbent component has a tendency to slough off, it may be preferable to embed it in the HEFC rather than bond it to the fiber surface. On the other hand, if the absorbent material can be rigidly and substantially irreversibly bonded to the outer surface of the hydrophilic elastomeric fibers then coating may be preferable over embedding. Additionally if, the mass transfer rate from the fiber to the absorbent material is slow to the extent that the device is substantially nonfunctional then coating the absorbent component onto the fibers may be preferable over embedding.

In one embodiment a solution of a hydrophilic material is mixed with a solution of an elastomeric material and the mixture of the two is then spun resulting in a fiber comprising both materials. Fibers made in this manner may have a homogenous composition, wherein the elastomeric and hydrophilic materials are uniformly distributed. Alternatively, the fibers may comprise well-defined phases, or a portion of the fiber may be a homogenous solid solution and a portion may be phase-separated. In another embodiment, the fiber may comprise a block copolymer wherein the blocks further comprise elastomeric blocks and hydrophilic blocks. The blocks may be arranged randomly or in any of a variety of suitable patterns.

In any case, the fibers of the present invention function primarily as a conduit for delivering liquids to an absorbent component where the liquid will be entrapped. Thus, the fiber acts in the manner of a wick in the sense that it provides a means for fluid flow. This wicking property coupled with a difference in absorption capacity and rate between the HEFC and the absorbent component results in a net flow to the absorbent component. That is to say, that since the HEFC both absorbs more quickly than the absorbent component and has a smaller holding capacity it tends to reach its holding capacity more quickly. Thus, there tends to be a net flow from the fiber to the absorbent component.

In another embodiment one or more hydrophilic components can be combined with one or more elastomeric components to yield filtration media for use in accordance with the present invention. In this embodiment, it is believed that when the one or more hydrophilic components come into contact with water that they absorb the water and expand, thereby entrapping the water and causing the removal of such from the organic liquid or liquids being passed therethrough, thereabout, or thereon. Examples of suitable hydrophilic polymers include, but are not limited to, linear poly(ethylenimine), cellulose acetate and other grafted cellulosics, poly (hydroxyethylmethacrylate), poly (ethyleneoxide), poly vinylpyrrolidone, polyurethanes, polypropyleneoxides and mixtures and copolymers thereof. The hydrophilic component can be incorporated into the fiber, attached to the surface of the fiber, or physically held between fibers.

In this embodiment, it is also possible to combine the one or more hydrophilic components with one or more elastomeric components. It is believed that the one or more elastomeric components provide mechanical strength to the filtration media of the present invention, and thus the ability to withstand more vigorous filtration processes. Additionally, mechanical strength is also advantageous in that it provides a method by which to hold the filtration assembly in place during use. Examples of suitable elastomeric polymers include, but are not limited to, polyurethanes, polyesters, polyanhydrides, polyamides, polyimides and mixtures and copolymers thereof.

Some embodiments of the present invention can also include one or more adhesive components for adhering the assembly to a substrate. Suitable polymers having adhesive properties include, but are not limited to, homopolymers and copolymers of acrylates, polyvinylpyrollidones, and silicones and mixtures thereof.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What we claim is:

1. A method for removing water from an organic liquid, the method comprising the step of:
    (A) contacting a water-containing organic liquid with at least one filtration medium designed to remove all or substantially all of the water present in the organic liquid; and
    (B) removing substantially all of the water from the organic liquid to yield a water-free organic liquid,
    wherein the at least one filtration medium is formed from at least one absorbent fibrous component and at least one hydrophilic elastomeric fibrous component,
    wherein the absorbent fibrous component is selected from polyesters, polyethers, polyester-polyethers, polymers having pendant carboxylic acids or pendant hydroxyls, polysiloxanes polyacrylamides, kaolins, serpentines, smectites, glauconite, chlorites, vermiculites, attapulgite, sepiolite, allophone and imogolite, sodium polyacrylates, 2-propenamide-co-2-propenoic acid, or any combination of two or more thereof,
    wherein the hydrophilic elastomeric fibrous component is selected from zein protein, polyester elastomers, polydimethylsiloxane, hydrophilic poly(ether-co-ester) elastomers, silicone-co-polyethyleneglycol elastomers, polyacrylates, thermoplastic polyurethanes, poly(ether-co-urethanes), or any combination of two or more thereof,
    wherein the absorbent fibrous component is embedded in the hydrophilic elastomeric fibrous component,
    and wherein the at least one absorbent fibrous component and the at least one hydrophilic elastomeric fibrous component differ from one another and the at least one absorbent fibrous component is more absorbent than the at least one hydrophilic elastomeric fibrous component.

2. The method of claim 1, wherein the absorbent fibrous component is present in an amount from about 1% (w/w) to about 85% (w/w) in the filtration medium.

3. The method of claim 1, wherein the absorbent fibrous component is present in an amount from about 5% (w/w) to about 50% (w/w) in the filtration medium.

4. The method of claim 1, wherein the absorbent fibrous component is present in an amount from about 30% (w/w) to about 50% (w/w) in the filtration medium.

5. The method of claim 1, wherein the at least one hydrophilic elastomeric fibrous component is selected from polyurethanes, polyester-co-urethanes, or any combination thereof.

6. The method of claim 1, wherein the filtration medium is selected from one or more mats, one or more fibers, one or more nanofibers, or one or more fiber/nanofibers-containing structures.

7. The method of claim 1, wherein the filtration medium is formed from one or more mats.

8. The method of claim 1, wherein the at least one filtration medium further comprises a non-fibrous absorbent component.

9. The method of claim 1, wherein the fibers are nanofibers.

* * * * *